(12) United States Patent
Yusof

(10) Patent No.: US 7,791,720 B2
(45) Date of Patent: Sep. 7, 2010

(54) SEMICONDUCTOR MANUFACTURING PERIPHERAL VERIFICATION TOOL

(75) Inventor: Mohd Zuraimi Md Yusof, Kuala Lumpur (MY)

(73) Assignee: Texas Instruments Incorporated, Dallas, TX (US)

( * ) Notice: Subject to any disclaimer, the term of this patent is extended or adjusted under 35 U.S.C. 154(b) by 33 days.

(21) Appl. No.: 11/967,411

(22) Filed: Dec. 31, 2007

(65) Prior Publication Data

US 2009/0168055 A1      Jul. 2, 2009

(51) Int. Cl.
*G01N 21/00*       (2006.01)
(52) U.S. Cl. .................. 356/237.1; 414/937; 250/559.4
(58) Field of Classification Search ... 356/237.1–237.5, 356/625–640; 250/559.4, 223 R; 414/937, 414/217, 940
See application file for complete search history.

(56) References Cited

U.S. PATENT DOCUMENTS

| | | | | |
|---|---|---|---|---|
| 4,786,816 A | * | 11/1988 | Ohmori et al. | 250/559.12 |
| 4,803,373 A | * | 2/1989 | Imamura et al. | 250/559.29 |
| 4,806,773 A | * | 2/1989 | Hiraga et al. | 250/548 |
| 5,003,188 A | * | 3/1991 | Igari | 250/559.4 |
| 5,225,691 A | * | 7/1993 | Powers et al. | 250/559.4 |
| 5,266,812 A | * | 11/1993 | Mokuo | 250/559.4 |
| 5,350,899 A | * | 9/1994 | Ishikawa et al. | 219/494 |
| 6,126,380 A | * | 10/2000 | Hillman | 414/744.6 |
| 6,390,754 B2 | * | 5/2002 | Yamaga et al. | 414/217 |

* cited by examiner

*Primary Examiner*—Hoa Q Pham
(74) *Attorney, Agent, or Firm*—Yingsheng Tung; Wade J. Brady, III; Frederick J. Telecky, Jr.

(57) ABSTRACT

Apparatus and methods for verification of the dimensions of a semiconductor manufacturing peripheral are disclosed, in which the peripheral, e.g., a wafer cassette, is positioned between, and is enveloped by, an emitter housing and an opposing receiver housing adapted for emitting and receiving, respectively, light from a selected portion of the electromagnetic spectrum, preferably infrared. The measured light is used to verify the dimensions of the target peripheral in comparison with a pre-selected standard.

10 Claims, 2 Drawing Sheets

SEMICONDUCTOR MANUFACTURING PERIPHERAL VERIFICATION TOOL

TECHNICAL FIELD

The invention relates to electronic semiconductor chips and manufacturing. More particularly, the invention relates to semiconductor manufacturing and handling equipment and to methods related to processes associated with the mass-production of microelectronic semiconductor chips and to apparatus and methods for the verification that peripherals used for handling semiconductor chip workpieces during manufacturing are within dimensional tolerances.

BACKGROUND OF THE INVENTION

The various peripherals for handling semiconductor workpiece lots are exemplified herein for the purposes of example by wafer cassettes, generally referred to herein as "cassettes" unless otherwise specified for particular instances. Practitioners of the relevant arts will recognize the broader applicability of the background, description, claims, drawings, and requisite skill in the arts to semiconductor manufacturing peripherals in general.

In the manufacturing of electronic semiconductor devices, it is common to fabricate numerous chips on a semiconductor wafer. It is also common to process chips in manufacturing lots contained by a tray, magazine, or other conveyance, or "peripheral" for holding multiple workpieces. During the manufacturing process, it is often desirable to handle the workpieces, wafers for example, for conveyance to equipment used for various processes involved in manufacturing, such as implantation, photo-resist, cleaning, and testing. In general, wafers are handled in production lots, commonly twenty-five wafers, held in a horizontal orientation in an apparatus such as a cassette, magazine, tray, rack, or carrier. The cassettes perform the function of segregating and safely holding and conveying the wafers during movement from one piece of equipment to another for processing. Several variations of wafer cassettes may be used, depending on the particular manufacturing process being performed. For example, Teflon (a registered trademark of E. I. du Pont de Nemours and Company) cassettes may be employed to hold the wafers while they are in chemical processes, ABS (acrylonitrile butadiene styrene) or other plastic traveler cassettes may be used to transport wafers from one process area to the next, and quartz or stainless steel cassettes may be employed to retain wafers during high temperature processes.

Semiconductor chip manufacturing equipment typically includes processing equipment serviced by robotic apparatus such as a transfer blade used for transferring wafers one-at-a-time to the processing equipment from a wafer cassette. Typically, the cassette is loaded into a cassette support position provided on or adjacent to the equipment. In general, a wafer cassette has multiple slots for accommodating the individual wafers, and the wafer cassette itself is loaded onto a wafer cassette support. While the cassette is stationary in the support, each wafer is taken out of its respective slot of the wafer cassette and is transferred to the processing or testing equipment by a robotic transfer blade. Similarly, processed wafers are removed from the processing equipment and replaced in their respective slots by the robotic transfer blade. Inherent in such processes and systems is the requirement for precise mechanical alignment of the transfer blade with the wafers. It is known in the arts to visually or mechanically align the top and/or bottom of the cassette with the transfer blade mechanism. In systems known in the arts, it is generally assumed that alignment of the top and/or bottom of the cassette relative to the equipment equates to alignment of the wafers held by the cassette with the transfer blade. This approach can lead to unfavorable surprises in situations when the assumption of alignment is incorrect. For example, if a particular cassette is outside of the dimensions required for the particular application, which may occur due to causes such as defects, damage, or wear, misalignment may occur, possibly leading to process delays, damage to wafers, or contamination of nearby wafers and equipment due to debris from wafer breakage.

These and other problems in making precise wafer cassette alignment lead to additional difficulties such as increased time required to perform the manufacturing processes, decreased yield due to improper alignment, and damaged wafers and equipment. Problems similar to those discussed in the illustrative example including wafer cassettes exist for other peripherals for handling wafers or other workpieces such as manufacturing lots of individual chips. It would be desirable in the arts to develop apparatus, systems, and methods providing improved dimensional verification of peripherals to ensure proper alignment relative to other manufacturing and testing equipment. Such improvements would provide advantages, such as reduced cycle time, increased yield, improved accuracy, and convenience. The present invention is directed to overcoming, or at least reducing the effects of one or more of the problems present in the arts.

SUMMARY OF THE INVENTION

In carrying out the principles of the present invention, in accordance with preferred embodiments thereof, the invention provides apparatus and methods for automated semiconductor manufacturing peripheral verification.

According to one aspect of the invention, a preferred embodiment of a method for verification of the dimensions of a semiconductor manufacturing peripheral according to the invention includes the steps of positioning the peripheral between an emitter housing and an opposing receiver housing. Further steps include emitting a selected spectrum of light from the emitter housing and measuring the selected spectrum of light received at the receiver housing. Using the measurements thus obtained, the dimensions of the peripheral are verified in comparison with a pre-selected standard.

According to another aspect of the invention, an example of a method for verification of the dimensions of a semiconductor manufacturing peripheral includes the selection of a portion of the spectrum comprising infrared light for use in making verification measurements.

According to another aspect of the invention, a preferred embodiment of a semiconductor manufacturing peripheral alignment verification tool includes an emitter housing and an opposing receiver housing configured for enveloping a peripheral between them. A light emitter is provided in order to emit light from a selected portion of the electromagnetic spectrum for measuring by a receiver positioned opposite. Control electronics and preprogrammed instructions are used for determining the presence or absence of a portion of a peripheral at a particular location enveloped by the emitter housing and receiver housing.

According to yet another aspect of the invention, an example of a preferred embodiment of a semiconductor manufacturing peripheral alignment verification tool includes an emitter and receiver adapted to emit and receive a portion of the electromagnetic spectrum comprising infrared light.

According to additional aspects of the invention, preferred embodiments of semiconductor manufacturing peripheral alignment verification tools include mechanical means for causing the peripheral to move horizontally and/or vertically, along with control means whereby the mechanical means may be controlled based on one or more of the dimensions of the peripheral.

The invention has advantages including but not limited to one or more of the following: electronically verifying manufacturing peripheral dimensions; ensuring precise alignment of a peripheral during loading and unloading processes; decreasing cycle time; decreasing the risk of workpiece damage during processing and handling; and, reducing semiconductor device manufacturing costs. These and other features, advantages, and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as first, second, top, bottom, upper, side, etc., refer to the drawings themselves as laid out on the paper and not to physical limitations of the invention unless specifically noted. The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

While the making and using of various exemplary embodiments of the present invention are discussed herein, it should be appreciated that the present invention provides inventive concepts which can be embodied in a wide variety of specific contexts. It should be understood that the invention may be practiced with semiconductor workpiece manufacturing, handling and transfer methods, peripherals, and mechanisms of various types and materials without altering the principles of the invention. For purposes of clarity, detailed descriptions of functions and systems familiar to those skilled in the semiconductor manufacturing equipment and processing arts are not included.

In general, the invention provides apparatus and methods for using light, preferably infrared (IR), emitters and receivers installed in fixed locations in order to verify the dimensions of a target workpiece-handling peripheral such as a wafer cassette. The exemplary embodiment shown and described using the invention in a context in which "go" and "no-go" wafer cassette conditions may be determined quickly and accurately, in turn providing advantages to additional manufacturing and testing processes. The example is not intended to be limiting, as the invention may be practiced with a number of workpiece-handling peripherals known in the arts such as carriers, trays, magazine, and racks in various forms, having as a common attribute the facilitation of handling manufacturing lots of workpieces such as chips, leadframes, or other components.

Figure 1:
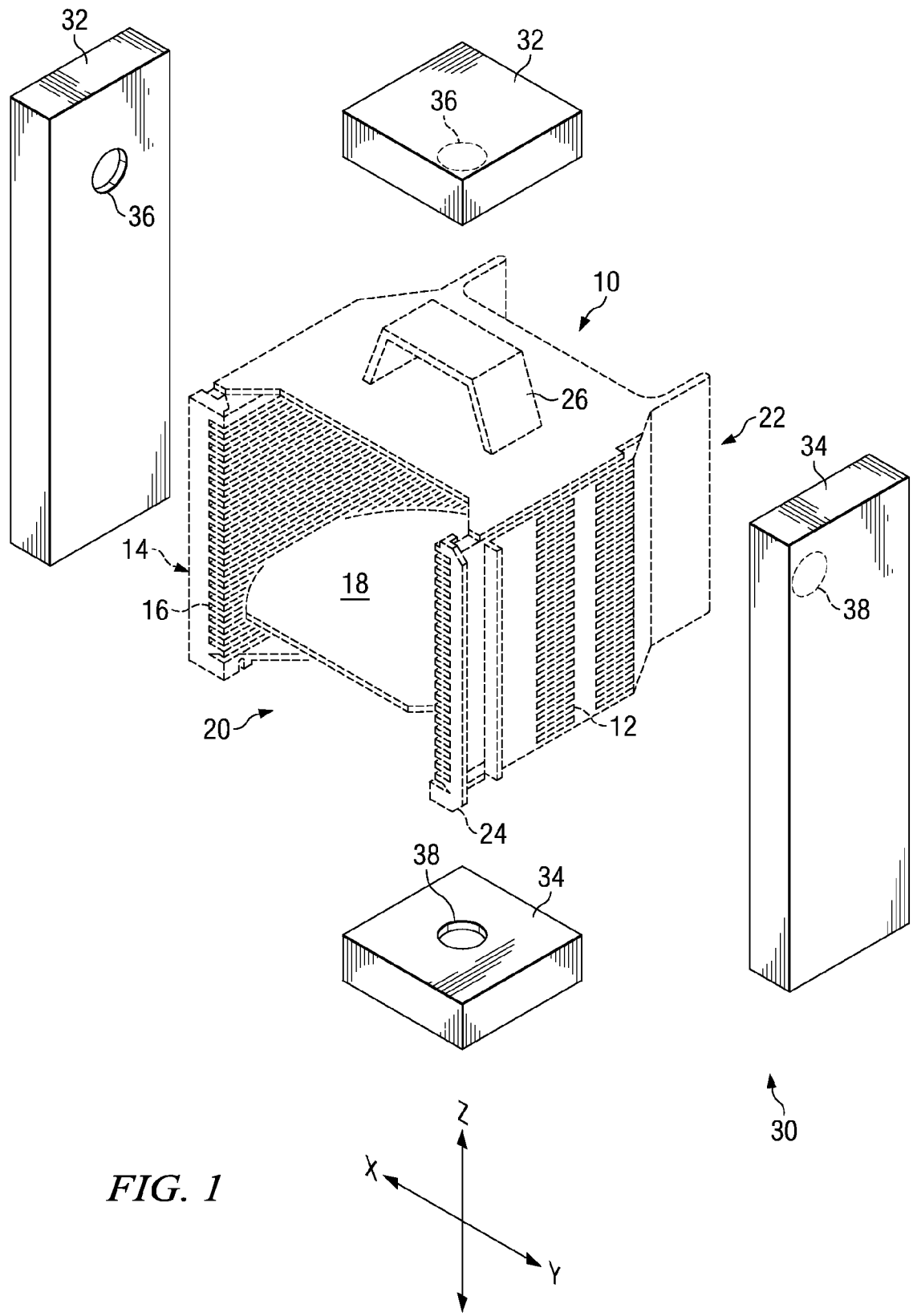
FIG. 1 is a simplified schematic perspective view illustrating aspects of apparatus, systems, and methods according to an example of preferred embodiments of the invention.

Referring primarily to FIG. 1, a typical industry standard semiconductor wafer cassette 10 is shown having the general form of a box. Side walls 12, 14, and support shelves 16 are provided along each side configured for accepting the individual wafers 18, usually in lots of twenty-five, which may be inserted and removed through an open side e.g., the "front" 20 of the cassette 10. The wafer cassette 10 may also have various appendages such as mechanical guides 22, shoes 24, or lifting cleats 26, used for positioning the cassette 10 relative to wafer handling and processing equipment familiar in the arts. A semiconductor manufacturing peripheral verification tool 30 of the present invention is shown with an emitter housing 32 on one side and a receiver housing 34 on the opposite side, with sufficient space to accommodate the peripheral, e.g., wafer cassette 10, in between. The emitter housing 32 and receiver housing 34 each include inward-facing light apertures 36, 38 respectively. Each of the light apertures, e.g., 38 of the receiver housing 34, is preferably aligned with a corresponding light aperture, e.g., 36 of the emitter housing 32, positioned opposite. Preferably, the light apertures 36, 38, of the transmitter 32 and receiver 34 are arranged in pairs with at least one set provided for sending and receiving respectively along the x, y, and z, axes of the cassette 10. As shown, the functions and components of the invention may be duplicated for operation along any selected axis or combination of axes. It should be understood by those skilled in the applicable arts that the invention may be implemented in a variety of alternative embodiments and may be used with various types of wafer handling peripherals such as variations of wafer cassettes, carriers, trays, and magazines used in the arts.

Figure 2:
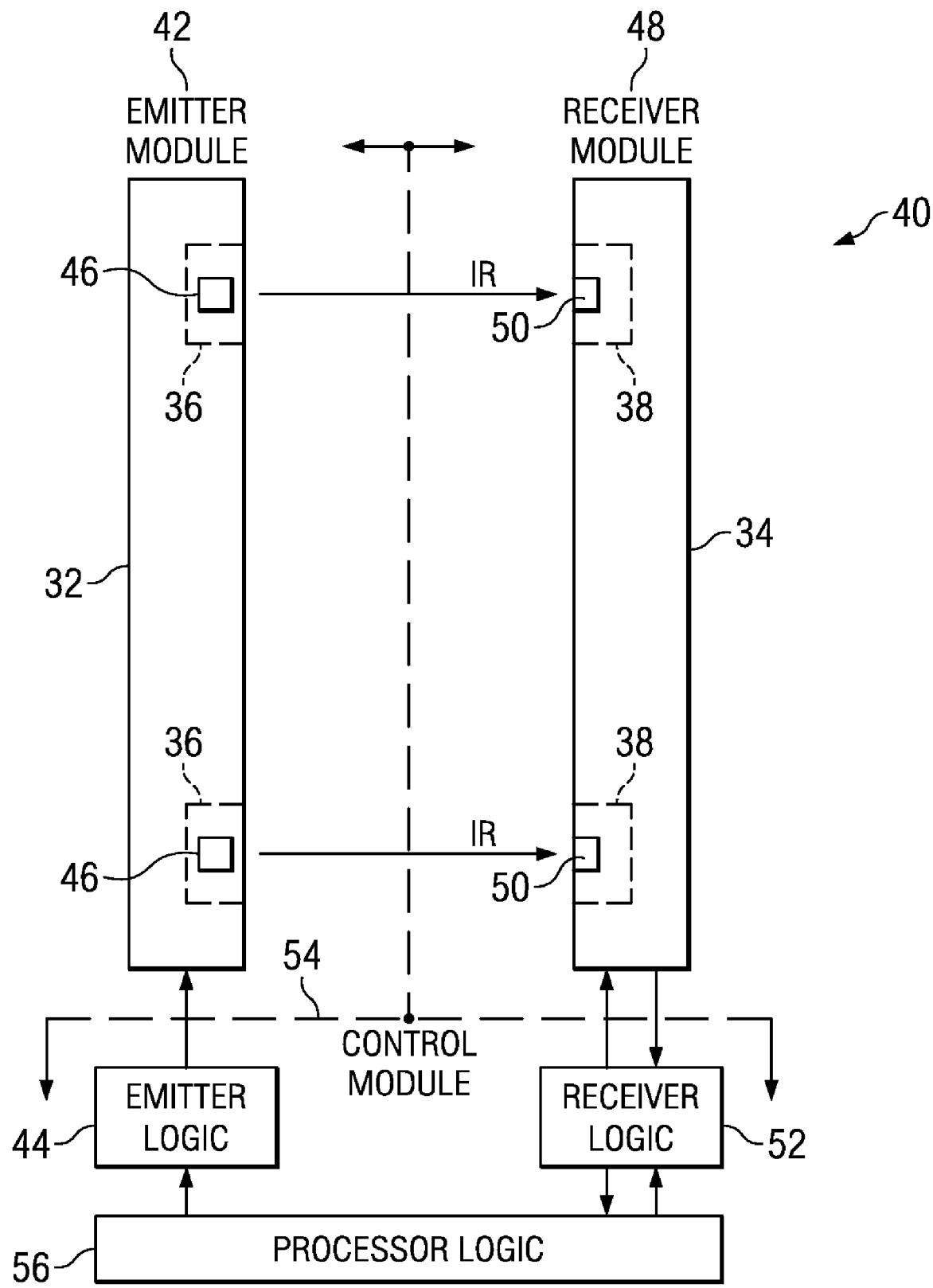
FIG. 2 is a simplified schematic diagram depicting functional modules of an example of preferred embodiments of the invention.

Now referring to FIG. 2, a block diagram representative of an example of circuitry 40 employed in a preferred embodiment of a semiconductor manufacturing peripheral verification tool of the present invention is shown. An emitter module 42 includes transmitter control logic 44 for controlling one or more light emitters 46, preferably infrared light (IR) emitting diodes. Preferably, at least two IR emitting diodes 46 are used in order to verify alignment of a peripheral in each of the x-y, and z axes independently. The IR emitting diodes 46 are positioned in the light apertures 36 of the emitter housings 32 (also illustrated in FIG. 1). The emitter control logic 44 operates to control the current to each of the IR emitter diodes 46, thereby permitting the intensity of the infrared light emitted (indicated by arrows IR) to be varied over a suitable range, adaptable to ambient conditions for example. Each of the IR emitter diodes 46 preferably has a relatively narrow beam angle, less than approximately twenty-five degrees for example, thereby concentrating the emitted light in a relatively small target area. A receiver module 48 includes one or more receivers 50, preferably infrared (IR) photo detectors, for example, positioned at the receiver apertures 38 of the receiver housings 34. The receivers 50 are controlled by receiver control logic 52 as needed to adapt to conditions associated with use, such as the reduction of interference from ambient light. The receivers 50 are positioned relative to the positions of the emitters 46 such that each of the receivers 50 is capable of detecting light emitted from a corresponding emitter 46. The receivers 50 are preferably selected for their photo-sensitivity to the light spectrum matched to the emitters 46, for example a selected portion of the IR spectrum. Preferably, at least two IR receivers 50 are used in order to independently verify alignment in each of the x, y, and z axes. The preferred configuration is such that each axis of the peripheral, e.g., wafer cassette 10, has one of the emitters 46 on one side of the x-y axis, and a corresponding one of the receivers 50 on an opposing side of the x-y axis; likewise for the z-axis. A wide variety of photo sensitive circuitry is known in the arts and may be used in the implementation of the invention. Variable photo sensor specifications include, voltage range, sensing range, optimum power, sensing beam and output type. Depending upon the application in which the invention is used, a sensor in the infrared range of approximately 780-1500 nm is preferred, typically 880 nm. In general, a through-beam IR sensor system is preferable for accuracy and increased sensing range for larger target applications, having a sensing range of up to about 2 m. Normally open (NO), i.e., output "on" when target is present, or normally closed (NC) receivers may be used in either a PNP or NPN configuration.

With continued reference to FIG. 2, a control module 54 is coupled to emitter logic 44 and receiver logic 52. The control module 54 preferably includes such functions as emitter selection logic, receiver selection logic, and a microprocessor, collectively referred to as processor logic 56. The control module 54 preferably operates to turn on each of the emitters 46 and to read the state of each of the receivers 50 during the time that a particular one of the emitters 46 is turned on. A suitable program executed by the microprocessor 56 uses the information obtained from the receivers 50, along with pre-programmed instructions and information relating to the dimensional tolerances for the particular peripheral, and produces an output containing information representative of the presence or absence of a peripheral meeting particular standards within specified tolerances.

The operation of the invention may be characterized by the following general sequence, variations of which are possible, in order to give an overview of the methods of invention. With a target peripheral, such as a wafer cassette 10, enveloped between the emitter housing(s) 32 and receiver housing(s) 34, each of the IR emitters 46 is turned on for a period of time. During the period of time that each of the IR emitters 46 is in an "on" state, the state of each of the receivers 50 is read and stored in memory associated with the microprocessor logic 56 of the control module 54. The presence or absence of IR light in particular locations as indicated by the receivers 50, is analyzed in association with stored data, preferably including a pre-selected standard regarding an acceptable range of dimensions for the target peripheral, in this example the wafer cassette 10. In the event the target matches the standard within acceptable tolerances, the verification process may be ended and the next sequential manufacturing process commenced, e.g., wafer transfers associated with coating, cleaning, or testing. In the event the target peripheral is found to be outside of acceptable tolerances, such information is preferably transmitted to indicate the need for user intervention or other corrective action.

It should be appreciated by those skilled in the arts that the invention may be used to advantage in combination with apparatus adapted for finely controlled horizontal and vertical movement of the target peripheral. Accordingly, peripherals that are verified to be within acceptable tolerances may be manipulated using the capabilities of the invention in order to optimize their alignment with equipment associated with the manufacturing processes. Surprising advantages may accrue to the use of the electronic verification apparatus and methods of the invention in place of verification and alignment apparatus and methods previously used in the arts. The invention may be implemented in association with various mechanical movement systems, preferably precisely controllable horizontal and vertical movement techniques known in the arts. For example, those skilled in the arts will appreciate that a suitable mechanism may include functional capabilities for servo and/or stepper motor driven vertical and horizontal movement on a relatively small mechanical scale with high precision indexing, preferably controllable by stored computer program instructions for micro-scale positioning adjustments within the approximate range of 25-100 mm at velocities up to 150 mm/sec with 3 μm accuracy. Accuracy may also be increased using dynamic error mapping, resolution on the order of 0.025 μm, anti-creep crossed roller bearings, and other suitable techniques. Preferably, motor-controlled stages may be stacked to provide cost-effective x, y and z motion. Preferably, programming for movement control also includes reference indexes adapted for the particular application.

The apparatus and methods of the invention, exemplified by the disclosed preferred embodiments, provide fast and accurate non-mechanical verification of specified dimensions of semiconductor workpiece-handling peripherals within certain predetermined tolerances. In alternative embodiments, the invention may be practiced in combination with automated equipment for adjusting the horizontal and/or vertical alignment of manufacturing and handling peripherals, such as wafer cassettes for example, for use with semiconductor chip processing or test equipment. Electro-mechanical handling equipment known in the arts for adjusting the position of a peripheral relative to processing equipment may realize surprising advantages when used in combination with the verification processes and apparatus of the invention. The methods and systems of the invention provide one or more advantages including but not limited to improvements in accuracy and efficiency in electronic dimensional verification of wafer handling cassettes and other peripherals associated with semiconductor chip manufacturing processes. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

I claim:

1. A semiconductor manufacturing peripheral verification tool comprising:
   an emitter housing and an opposing receiver housing arranged for enveloping a peripheral between them;
   the emitter housing further comprising a light emitter for emitting light comprising a selected portion of the electromagnetic spectrum;
   the receiver housing further comprising a receiver for measuring light from the selected portion of the electromagnetic spectrum; and
   control means for selectively activating the emitter and for selectively interrogating the receiver to obtain light signal information therefrom;
   the control means further comprising logic responsive to the signal information obtained from the receiver for determining the presence or absence of a portion of a wafer cassette at a particular location enveloped by the emitter housing and receiver housing.

2. The semiconductor manufacturing peripheral verification tool according to claim 1 wherein the emitter and receiver are adapted to emit and receive a portion of the electromagnetic spectrum comprising infrared light.

3. The semiconductor manufacturing peripheral verification tool according to claim 1 further comprising logic means whereby the emitter and receiver signals may be used for verifying one or more vertical dimensions of the peripheral.

4. The semiconductor manufacturing peripheral verification tool according to claim 1 further comprising logic means whereby the emitter and receiver signals may be used for verifying one or more horizontal dimensions of the wafer cassette.

5. The semiconductor manufacturing peripheral verification tool according to claim 1 further comprising:
   mechanical means for causing the wafer cassette to move horizontally; and
      control means whereby the mechanical means may be controlled based on one or more of the dimensions of the wafer cassette.

6. The semiconductor manufacturing peripheral verification tool according to claim 1 further comprising:
   mechanical means for causing the wafer cassette to move vertically; and
      control means whereby the mechanical means may be controlled based on one or more of the dimensions of the wafer cassette.

7. The semiconductor manufacturing peripheral verification tool according to claim 1 further comprising user interface means for informing a user of the status of a wafer cassette operated upon by the tool.

8. The semiconductor manufacturing peripheral verification tool system of claim 1 in which the receiver has a receiving field of view less than or equal to 25 degrees.

9. A semiconductor manufacturing peripheral verification tool comprising:
   an emitter housing and an opposing receiver housing arranged for enveloping a peripheral between them;
   the emitter housing further comprising a light emitter for emitting light comprising a selected portion of the electromagnetic spectrum;
   the receiver housing further comprising a receiver for measuring light from the selected portion of the electromagnetic spectrum; and
   control means for selectively activating the emitter and for selectively interrogating the receiver to obtain light signal information therefrom;
   the control means further comprising logic responsive to the signal information obtained from the receiver for determining the presence or absence of a portion of a peripheral leadframe or substrate magazine at a particular location enveloped by the emitter housing and receiver housing.

10. A semiconductor manufacturing peripheral verification tool comprising:
   an emitter housing and an opposing receiver housing arranged for enveloping a peripheral between them;
   the emitter housing further comprising a light emitter for emitting light comprising a selected portion of the electromagnetic spectrum;
   the receiver housing further comprising a receiver for measuring light from the selected portion of the electromagnetic spectrum: and
   control means for selectively activating the emitter and for selectively interrogating the receiver to obtain light signal information therefrom;
   the control means further comprising logic responsive to the signal information obtained from the receiver for determining the presence or absence of a portion of a peripheral wafer frame cassette at a particular location enveloped by the emitter housing and receiver housing.

* * * * *